United States Patent
Shiohara

(10) Patent No.: US 11,429,331 B2
(45) Date of Patent: Aug. 30, 2022

(54) CONTROL METHOD AND INFORMATION PROCESSING APPARATUS EXTENDING THE FUNCTION OF A PRINTER DRIVER

(71) Applicant: CANON KABUSHIKI KAISHA, Tokyo (JP)

(72) Inventor: Tetsuya Shiohara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/027,445

(22) Filed: Sep. 21, 2020

(65) Prior Publication Data

US 2021/0004189 A1 Jan. 7, 2021

Related U.S. Application Data

(63) Continuation of application No. 16/299,753, filed on Mar. 12, 2019, now Pat. No. 10,809,955.

(30) Foreign Application Priority Data

Mar. 15, 2018 (JP) .............................. JP2018-048200

(51) Int. Cl.
*G06F 3/12* (2006.01)
*G06K 15/00* (2006.01)
*G06K 15/02* (2006.01)

(52) U.S. Cl.
CPC .......... *G06F 3/1276* (2013.01); *G06F 3/1205* (2013.01); *G06F 3/1211* (2013.01);
(Continued)

(58) Field of Classification Search
CPC .... G06F 3/1268; G06F 3/1204; G06F 3/1208;
G06F 3/1209; G06F 3/1225; G06F 3/1255; G06F 3/1256; G06F 3/1257; G06F 3/1258; G06F 3/1276; G06F 3/1245; G06F 3/1211; G06F 3/1205; G06F 3/1279;
(Continued)

(56) References Cited

U.S. PATENT DOCUMENTS 10,809,955 B2 * 10/2020 Shiohara ............... G06F 3/1257
2006/0033962 A1 * 2/2006 Matsunoshita .... H04N 1/32309
358/3.28
(Continued)

FOREIGN PATENT DOCUMENTS

CN 1617106 A 5/2005
CN 1828516 A 9/2006
(Continued)

*Primary Examiner* — Juan M Guillermety
(74) *Attorney, Agent, or Firm* — Canon U.S.A., Inc. I.P. Division

(57) ABSTRACT

There is provided a control method for an information processing apparatus that stores an editing application with which editing of intermediate data including drawing data generated by a drawing application can be performed, the control method including: obtaining information associated with a print setting; deciding an interface used for obtaining the intermediate data from among a plurality of interfaces on a basis of the obtained information associated with the print setting; and obtaining the intermediate data by using the decided interface, in which the intermediate data output from the editing application is obtained by a printer driver and converted into a print command.

32 Claims, 15 Drawing Sheets

(52) U.S. Cl.
CPC .......... *G06F 3/1245* (2013.01); *G06F 3/1257* (2013.01); *G06F 3/1258* (2013.01); *G06F 3/1279* (2013.01); *G06K 15/1805* (2013.01); *G06K 15/1849* (2013.01); *G06K 15/4045* (2013.01); *G06F 3/1208* (2013.01); *G06F 3/1256* (2013.01)

(58) Field of Classification Search
CPC ..... G06F 3/1236; G06F 3/1222; G06K 15/02; G06K 15/1805; G06K 15/1849; G06K 15/4045
See application file for complete search history.

(56) References Cited

U.S. PATENT DOCUMENTS

2011/0273741 A1* 11/2011 Mukasa ................ G06F 3/1205 358/1.15
2012/0236346 A1* 9/2012 Miyabe ............... G06F 9/44526 358/1.13
2013/0038887 A1 2/2013 Yamada
2019/0286402 A1* 9/2019 Shiohara ............... G06F 3/1257
2020/0012459 A1* 1/2020 Yamazaki ............. G06F 3/1256

FOREIGN PATENT DOCUMENTS

| | | |
|---|---|---|
| CN | 101587429 A | 11/2009 |
| CN | 101782842 A | 7/2010 |
| CN | 102404476 A | 4/2012 |
| CN | 103324451 A | 9/2013 |
| CN | 104885046 A | 9/2015 |
| CN | 107015770 A | 8/2017 |
| JP | 2009134645 A | 6/2009 |
| JP | 2009-282843 A | 12/2009 |
| JP | 2013-41329 A | 2/2013 |
| JP | 2014-209316 A | 11/2014 |

* cited by examiner

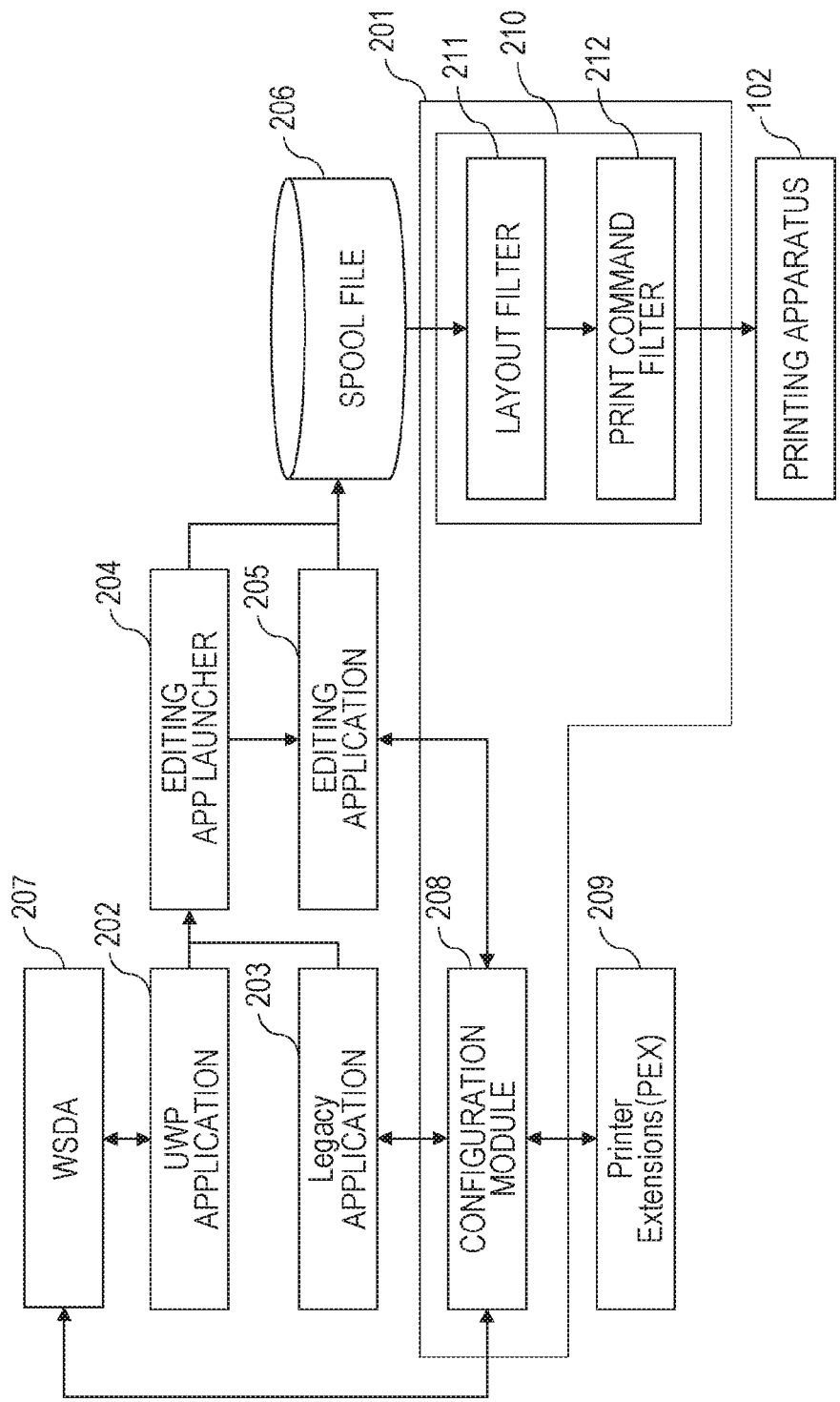

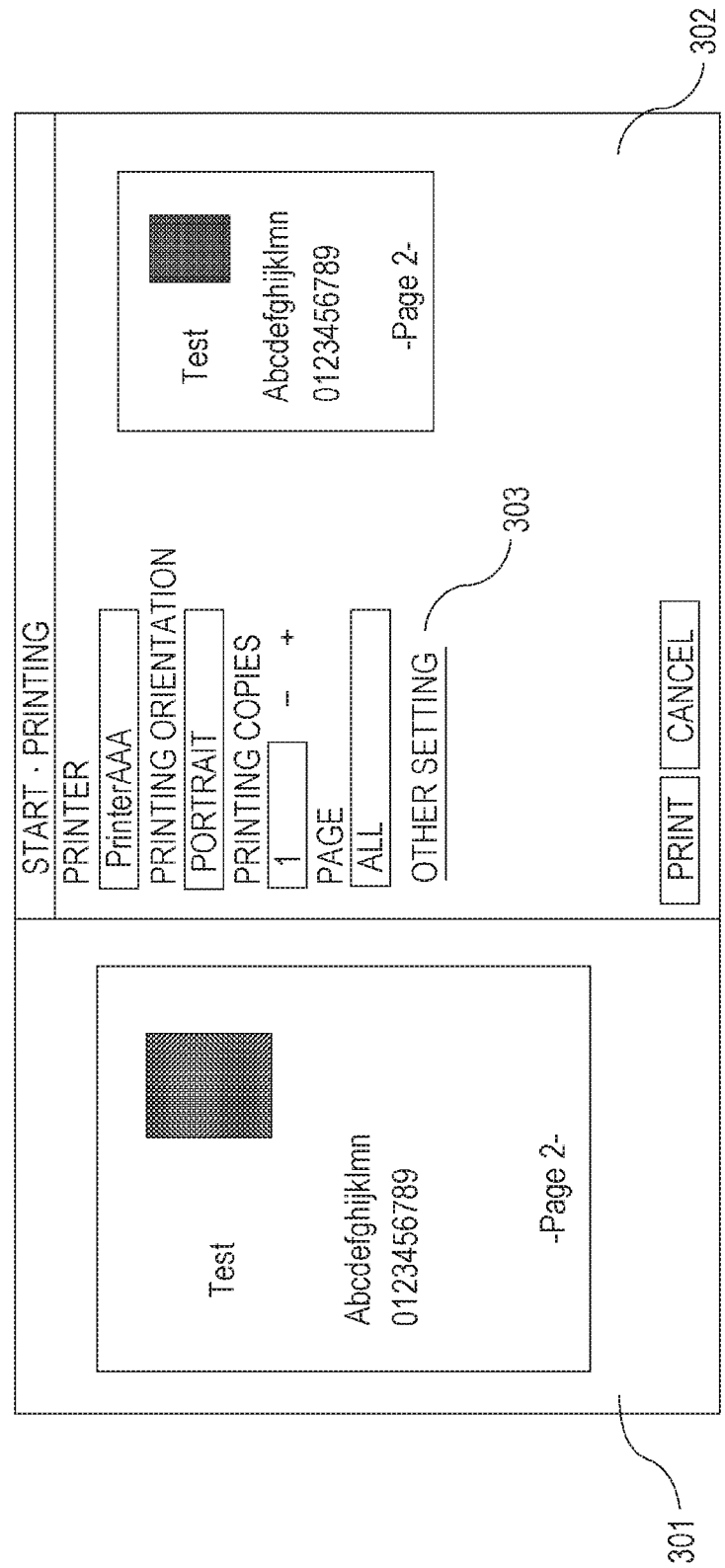

```
<psf:Feature name="psk:PageMediaType">
  <psf:Option name= "psk:Plain" constrained="psk:None"> … </psf:Option>
  <psf:Option name= "ns0000:PhotoPaper" constrained="psk:None" > … </psf:Option>
  ..
</psf:Feature >
<psf:Feature name="psk:JobNUpAllDocumentsContiguously">
  <psf:Option name= "ns0000:None" constrained="psk:None"> … </psf:Option>
  <psf:Option name= "ns0000:PagesPerSheet_2" constrained="psk:None" > … </psf:Option>
  ..
</psf:Feature >
<psf:Feature name="psk:JobPreview">
  <psf:Option name= "ns0000:ON" constrained="psk:None"> … </psf:Option>
  <psf:Option name= "ns0000:OFF" constrained="psk:None" > … </psf:Option>
  ..
</psf:Feature >
```

```
<psf:Feature name="psk:PageMediaType">
    <psf:Option name= "psk:Plain" />
</psf:Feature >
<psf:Feature name="psk:JobNUpAllDocumentsContiguously">
    <psf:Option name= "ns0000:None" />
</psf:Feature >
<psf:Feature name="psk:JobPreview">
    <psf:Option name= "ns0000:ON" />
</psf:Feature >
```

FIG. 10

| NAME | VALUE |
|---|---|
| RequestUI | ON |
| JobNUpAllDocumentsContiguously | PagePerSheet_2 |
| Pages | Ranges |
| Range | 1-2 |

# CONTROL METHOD AND INFORMATION PROCESSING APPARATUS EXTENDING THE FUNCTION OF A PRINTER DRIVER

CROSS-REFERENCE TO RELATED APPLICATIONS

The present application is a continuation of U.S. patent application Ser. No. 16/299,753, filed on Mar. 12, 2019, which claims priority from Japanese Patent Application No. 2018-048200 filed Mar. 15, 2018, which are hereby incorporated by reference herein in their entireties.

BACKGROUND OF THE INVENTION

Field of the Invention

The present invention relates to a control method and an information processing apparatus. In particular, the invention relates to a control method of an editing application and an information processing apparatus.

Description of the Related Art

A configuration has been generally proposed in which a printer driver installed into a host computer as software for controlling a printing apparatus is used, and printing is performed with respect to the printing apparatus connected to the host computer. An operating system (OS) corresponding to basic software is installed into the host computer. The printer driver is configured in accordance with a specification specified by the OS and operates when the printer driver is called from the OS. When a vender that provides the printing apparatus provides the printer driver adapted to the specification of the OS, it is possible to provide a unit configured to instruct the printer to perform printing by using the OS. In a case where a version before Microsoft (registered trademark) Windows (registered trademark) 8 is used as the OS, the printer driver is configured by an architecture called V3 printer driver. The V3 printer driver displays a graphical user interface (hereinafter, which will be also referred to as "GUI" or "user interface") at a timing when a print request from a user is generated. According to this GUI, it is possible to provide a function for urging the user to perform any operation. For example, when the print request is generated, since a specified event of a configuration module corresponding to a component of the V3 printer driver is called, the configuration module can display the user interface in the event processing.

In recent years, a new architecture called V4 printer driver has entered the market in Windows (registered trademark). Since the V4 printer driver puts a high priority on security performance, customization performance of the printer driver itself is decreased. For example, the above-described configuration module is provided by the OS, and the vender can provide only a setting file for customizing the operation or a script file. To compensate the above-described decrease in customization performance, the vender that provides the printing apparatus can provide a dedicated-use application for extending the function of the printer driver. An application called Windows Store Device App (WSDA) has been proposed as this application. When the vender that provides the printing apparatus can customize a print setting screen used when drawing data is to be printed by providing the WSDA (Japanese Patent Laid-Open No. 2017-33052).

SUMMARY OF THE INVENTION

A control method according to an aspect of the present invention relates to a control method for an information processing apparatus that stores an editing application with which editing of intermediate data including drawing data generated by a drawing application can be performed, the control method comprising obtaining information associated with a print setting, deciding an interface used for obtaining the intermediate data from among a plurality of interfaces on a basis of the obtained information associated with the print setting, and obtaining the intermediate data by using the decided interface, wherein the intermediate data output from the editing application is obtained by a printer driver and converted into a print command.

Further features of the present invention will become apparent from the following description of exemplary embodiments with reference to the attached drawings.

BRIEF DESCRIPTION OF THE DRAWINGS

FIG. 2 is a block configuration diagram of a driver printing system.
FIGS. 3A to 3C are schematic diagrams for describing a screen in a case where a print instruction is performed.
FIG. 5 illustrates an example of Print Capabilities.
FIG. 6 illustrates an example of Print Ticket.
FIG. 10 illustrates an example of information stored in Local Storage.

DESCRIPTION OF THE EMBODIMENTS

While security performance or usability of a V4 printer driver is improved, customization performance of the printer driver itself is decreased because, for example, the V4 printer driver does not include a function for providing a GUI. Therefore, as described in Japanese Patent Laid-Open No. 2017-33052, even in a case where a driver that does not include the function for providing the GUI like the V4 printer driver is used, it is possible to provide the GUI such as the print setting screen by using the WSDA. However, the related-art WSDA still has a restriction. In addition, an application called Printer Extensions (PEX) has also been proposed as the application for extending the function of the printer driver, but this PEX also has a restriction similar to that of the WSDA. The present invention has been made in view of the above-described issues and aims at providing a technology for providing a more appropriate function in accordance with a setting.

According to the following respective exemplary embodiments, a more appropriate function is provided by using an application called Print Workflow Application (WFA). This WFA is an editing application with which editing of intermediate data including drawing data generated by a drawing application can be performed. Since the editing application is activated in accordance with a print request, the editing application is also referred to as a printing-time activation application. A detail of the editing application will be described below.

Hereinafter, exemplary embodiments of the present invention will be described in detail with reference to the accompanying drawings. It should be noted that the following exemplary embodiments are not intended to limit the present invention described in the scope of the invention, and all of combinations of features described according to the present exemplary embodiment are not necessarily essential to a device for solving for the present invention.

First Exemplary Embodiment

Figure 1:
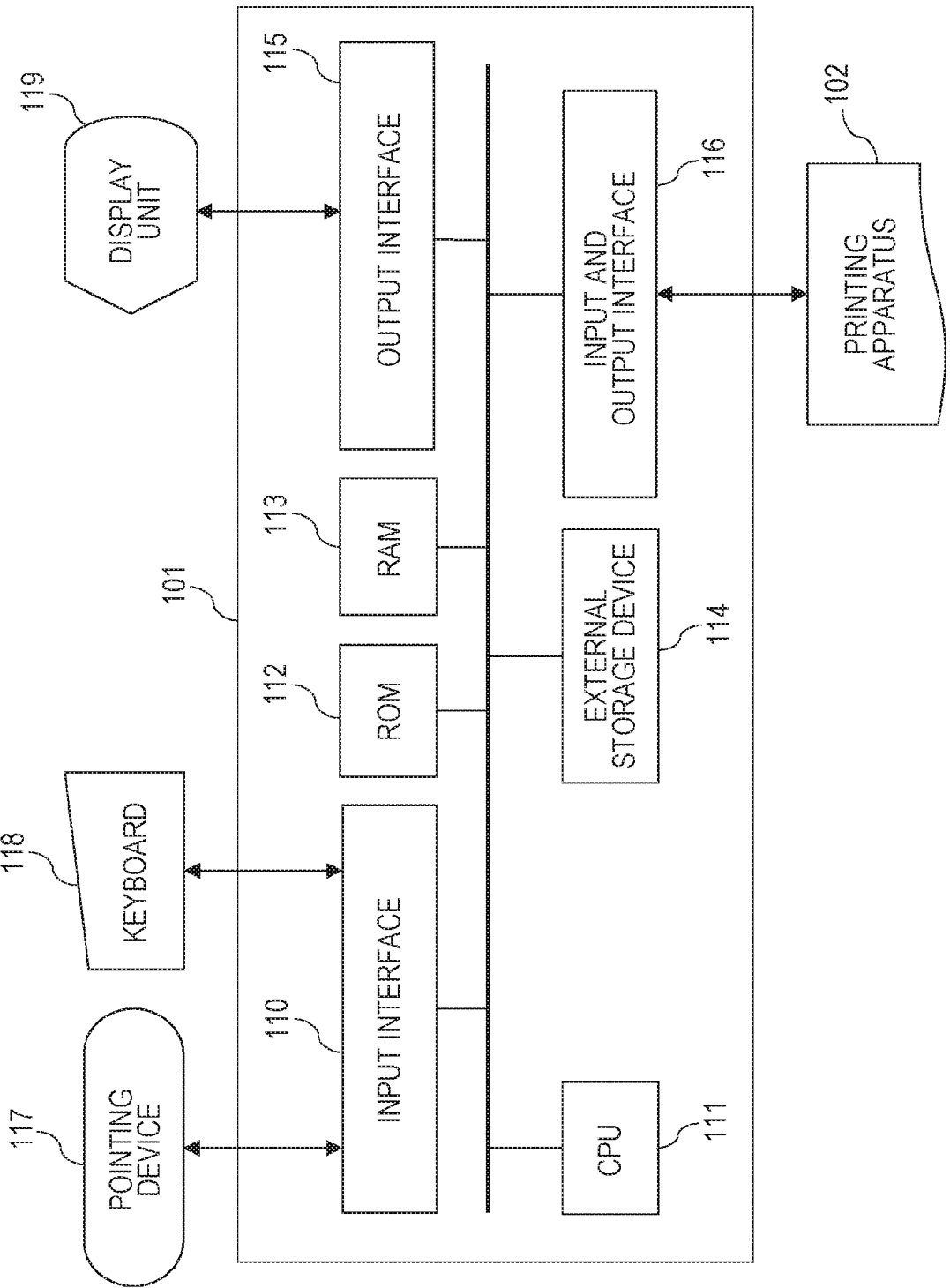
FIG. 1 is a block diagram illustrating a hardware configuration of a printing system.

FIG. 1 is a block diagram illustrating a hardware configuration of a printing system. In FIG. 1, a host computer 101 is an example of an information processing apparatus. The host computer 101 includes an input interface 110, a central processing unit (CPU) 111, a read only memory (ROM) 112, a random access memory (RAM) 113, an external storage device 114, an output interface 115, and an input and output interface 116. Input devices such as a keyboard 118 and a pointing device 117 are connected to the input interface 110. A display device such as a display unit 119 is connected to the output interface 115.

The ROM 112 stores an initialization program, and the external storage device 114 stores a group of application programs, an operating system (OS), a printer driver, and other various data. The RAM 113 is used as a work memory or the like when the various programs stored in the external storage device 114 are executed.

It should be noted that, according to the present exemplary embodiment, when the CPU 111 performs processing in accordance with a procedure of the program stored in the ROM 112, a function which will be described below in the host computer 101 and processing related to a flow chart which will also be described below are realized. The printing apparatus 102 functioning as a device is connected to the host computer 101 via the input and output interface 116. Herein, the host computer 101 and the printing apparatus 102 are separately constituted, but these apparatuses may also be constituted as a single information processing apparatus.

Block Configuration of Driver Printing System

FIG. 2 is a block configuration diagram of a driver printing system. Herein, descriptions will be provided while it is assumed that the host computer 101 in which an OS of Microsoft (registered trademark) Windows (registered trademark) 8 or a subsequent version is installed as the OS is used, and a printing system operating under an architecture called V4 printer driver is adopted. It should be noted that descriptions will be provided while a model specific printer driver functioning as a printer driver dedicated to the model of the printing apparatus 102 which is provided by the printer vender is used as the printer driver according to the present exemplary embodiment, for example. However, the printer driver according to the present exemplary embodiment is not limited to the model specific printer driver. For example, the printer driver may be a common printer driver provided by a printer vender which is compatible to printing apparatuses of a plurality of types of the printer vender. In addition, the printer driver may be a class driver (standard printer driver using a standardized printing method) that can be commonly used by printing apparatuses provided by a plurality of venders corresponding to a driver provided as one of functions in a package of the OS together with the OS.

When a user instructs printing from a Universal Windows Platform (UWP) application 202, a predetermined screen is displayed by Modern Print Dialog (MPD) corresponding to a function of the OS which is not illustrated in the drawing. The UWP application 202 is a drawing application for generating drawing data (such as an image or text information which becomes a source for forming a print on paper). A screen provided by the MPD includes a print preview function with which a print result can be checked on the screen and a function with which the user can select a basic print setting.

Figure 3A:
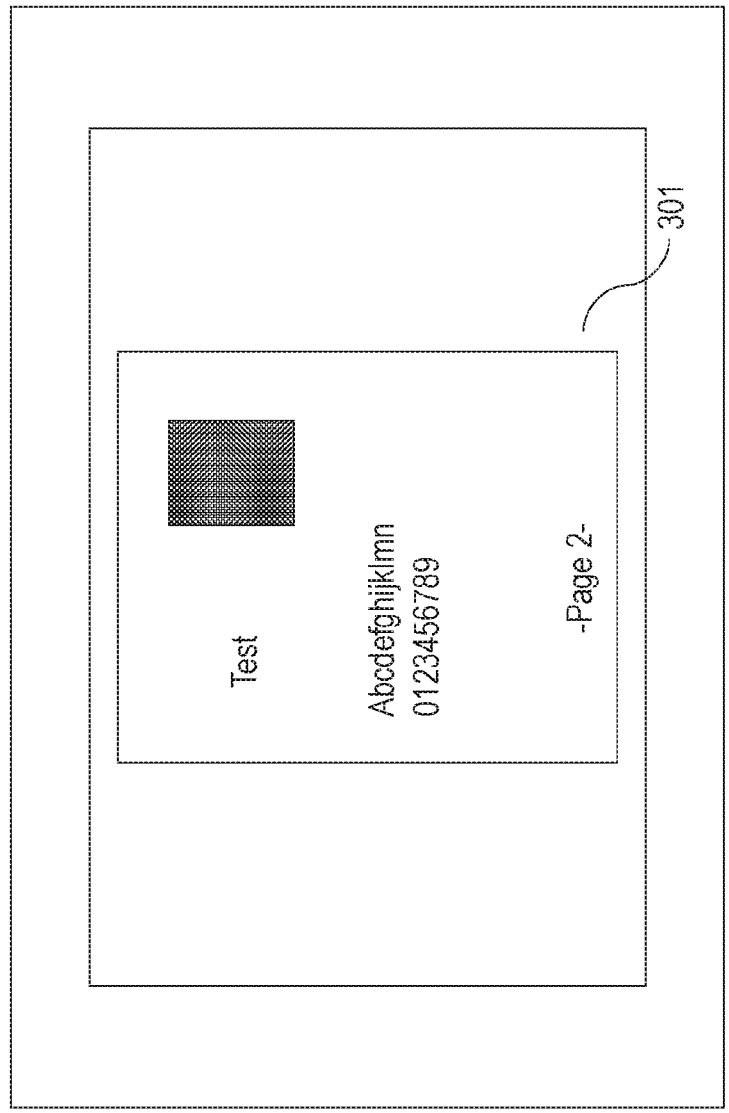
Figure 3C:
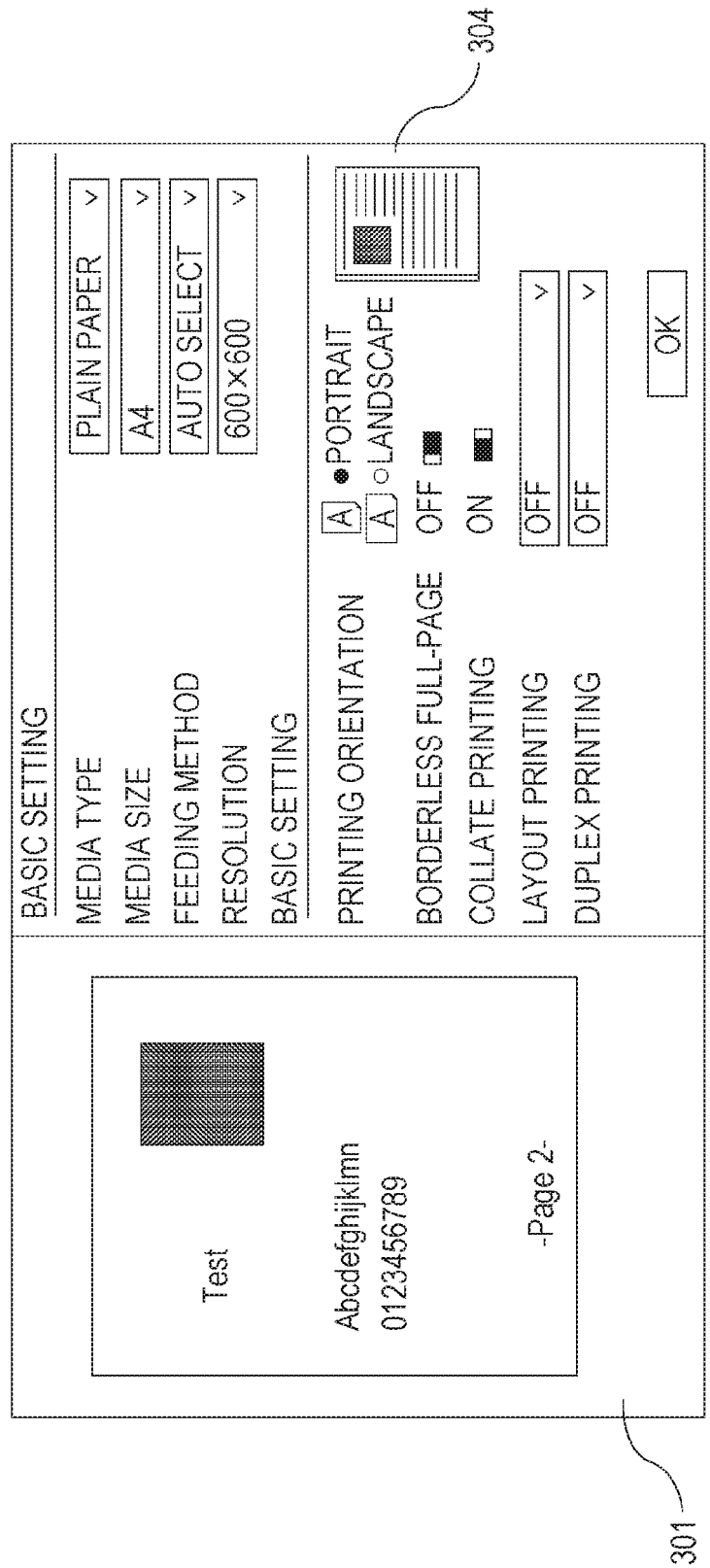

FIGS. 3A to 3C illustrate examples of a specific screen displayed at the time of the print setting. In FIG. 3A, when a print instruction is issued on a screen 301 provided by the UWP application serving as the drawing application, a setting screen 302 illustrated in FIG. 3B is displayed by the MPD of the OS. The user can select a driver to be used on the setting screen 302. Furthermore, a basic print setting can also be instructed on the setting screen 302.

Furthermore, the MPD activates Windows Store Device Application (hereinafter, WSDA) 207 where a detailed print setting can be selected by the user in response to the instruction from the user. Specifically, when an "other setting" button 303 is specified on the setting screen 302 of FIG. 3B, a detail setting screen 304 provided by the WSDA which is illustrated in FIG. 3C is displayed. The user can specify a further detailed print setting on the detail setting screen 304. The WSDA 207 is an application for extending a function of a printer driver 201 which is provided by a vender that provides the printing apparatus (hereinafter, a printer vender). It should be noted that an image looking like an original (document) image displayed on a right side within the detail setting screen 304 provided by the WSDA of FIG. 3C is a sample image originally included in the WSDA. That is, this sample image is not a preview image based on the drawing data generated by the UWP application but is the sample image that does not change even when the drawing data is changed.

The WSDA 207 receives information indicating the print setting from the MPD and changes the setting information in accordance with the setting by the user to be returned to the MPD. Herein, the information indicating the print setting is described in an XML format on the basis of a form defined by the OS and is included data called Print Ticket. The WSDA 207 can refer to and change the Print Ticket but does not refer to the drawing data.

It should be noted that the Print Ticket is generated by a configuration module 208 of the selected printer driver 201. The WSDA 207 generates (edits) the Print Ticket on which the specification by the user is reflected by calling the configuration module 208. The configuration module 208 also includes a function for generating Print Capabilities in which functions that can be set by the selected printer driver 201 and selection items are described in the XML format on the basis of the form defined by the OS. The WSDA 207 or PEX 209 which will be described below provides the user interface on the basis of information described in the Print Capabilities. An editing application 205 which will be described below can obtain the Print Capabilities generated by the configuration module 208 via the function of the OS.

It should be noted that the configuration module 208 is described as the function of the printer driver 201 in FIG. 2, but the configuration module 208 is originally a component of the OS. However, since the driver itself is not provided with a configuration module in the V4 printer driver, the configuration module 208 corresponding to the component of the OS is used as the configuration module of the driver. The printer vender can customize an operation of the configuration module 208 by GPD or Javascript (registered trademark) Constraint, which is not illustrated in the drawing, included in the printer driver 201.

When a "print" button is instructed on the setting screen 302 provided by the MPD of the OS after the print setting illustrated in FIGS. 3A to 3C, a print request is issued. When the printing is instructed by the user on the MPD, the request is received from the MPD, and the UWP application 202 generates printing data used for the printing. This printing data corresponds to an XPS document described in a form called XML Paper Specification (hereinafter, XPS) and is also referred to as intermediate data. The printing data according to the present exemplary embodiment includes the above-described Print Ticket and the drawing data generated by the drawing application.

The XPS document generated by the UWP application 202 is passed over to an editing app launcher 204 corresponding to a component of the OS. The editing app launcher 204 determines whether or not the editing application 205 associated with the printer driver 201 via Device Metadata (hereinafter, which will be also simply referred to as Metadata) exists and is also configured to be activated. In a case where it is determined that the editing application 205 exists and is also configured to be activated, the editing application 205 is activated. It should be noted that, in a case where the relevant editing application 205 does not exist, the editing app launcher 204 stores the XPS document as a spool file 206.

Herein, a relationship between the WSDA 207 and the editing application 205 will be described. The WSDA 207 is an extension application for extending the function of the printer driver. Specifically, when a driver that does not include a function for providing a graphical user interface (hereinafter, "GUI" or simply also referred to as "user interface") like the V4 printer driver is selected, the WSDA 207 can provide the GUI such as the print setting screen. However, the WSDA 207 does not provide a function for urging the user to perform any operation by displaying the GUI at a timing when the print request from the user is generated like the V3 printer driver. In view of the above, according to the present exemplary embodiment, the editing application 205 that operates in response to the print request from the user is used.

The editing application 205 is called Print Workflow Application and is an extension application for extending the function of the printer driver 201 which is provided by the printer vender similarly as in the WSDA 207. That is, in a case where the driver that does not include the function for providing the GUI like the V4 printer driver is selected, it is possible to provide the GUI such as the print setting screen on the basis of the instruction of the OS. It should be noted that, in a case where the V3 printer driver including the function for providing the GUI is selected, the OS does not activate the editing app launcher 204 but stores the XPS document generated by the drawing application as the spool file 206. That is, in a case where the V3 printer driver is selected, the editing application 205 is not activated, and the GUI is not provided.

It should be noted that both the WSDA 207 and the editing application 205 are separate applications since the WSDA 207 and the editing application 205 are not provided as one of the components of the printer driver 201. In addition, the WSDA 207 and the editing application 205 can be configured together as one application, but for convenience, the WSDA 207 and the editing application 205 will be described herein as the separate applications to describe a difference from the related-art WSDA.

The WSDA 207 and the editing application 205 are obtained in general by the OS from an application distribution system which is not illustrated in the drawing (corresponding to a server managed by Microsoft (registered trademark)) via the Internet. The printer vender previously provides the Metadata to a server for the Metadata which is managed by Microsoft (registered trademark). Therefore, the appropriate WSDA 207 and the appropriate editing application 205 are automatically installed into the host computer 101. In more detail, device identification information (Hardware ID) of the printing apparatus functioning as the device and software identification information (Identity Name) of the WSDA and the editing application are described in the Metadata. Device identification information (Hardware ID) is described in an Inf file of the printer driver. Therefore, when the printer driver is installed, the OS downloads the corresponding Metadata on the basis of the device identification information. The OS then refers to the Metadata and identifies software identification information (Identity Name) associated with the corresponding device identification information (Hardware ID), so that it is possible to obtain the corresponding WSDA and the corresponding editing application. Therefore, the printer driver 201 is associated with the WSDA 207 and the editing application 205.

The editing application 205 can display the user interface where the operation instruction is accepted from the user. The editing application 205 can also receive the XPS document corresponding to the printing data and edit the Print Ticket and the drawing data in the XPS document. It should be noted that the WSDA 207 corresponding to the same extension application can display the user interface but does not obtain the XPS document and does not refer to or edit the drawing data in the XPS document.

When the editing application 205 outputs the XPS document edited as needed, the OS stores the XPS document as the spool file 206. When the spool file 206 is stored, a file pipeline manager (not illustrated) in the printer driver 201 starts processing, and the number of filters and the order are controlled by a configuration file (not illustrated). The file pipeline manager is a system in which the printing is performed through a plurality of filters. A filter group 210 according to the present exemplary embodiment is configured by including a layout filter 211 functioning as a layout processing unit and a print command filter 212 functioning as a print command conversion unit. It should be noted that the file pipeline manager operates as the function of the printer driver 201, but the file pipeline manager itself is originally the component of the OS. However, since the driver itself is not provided with the file pipeline manager in the V4 printer driver, the file pipeline manager corresponding to the component of the OS is used as the function of the driver.

The layout filter 211 includes a function for performing layout processing of pages on the basis of the print setting information while the XPS document stored in the spool file 206 is set as an input and outputting the laid-out XPS document. The layout processing includes, for example, layout printing for printing a plurality of pages on a single sheet surface or poster printing for printing a single page on a plurality of sheet surfaces.

The print command filter 212 has a function for converting the XPS document corresponding to the intermediate data into a print command that can be interpreted by the printing apparatus 102 to be output in accordance with the print setting information while an output from the layout filter 211 is set as an input. The print command filter 212 is referred to as a render filter in general in a case where the print command filter 212 temporarily converts the XPS document as the input into image data. The render filter is used in a printer driver for an inexpensive raster printer represented by an inkjet printer in many cases. In a case where the print command filter 212 operates as the render filter, the XPS document as the input is temporarily converted into image data. Thereafter, after the course of image processing such as color space conversion or binarization, the image data is converted into a print command that can be interpreted by the raster printer.

In a case where types of print commands which can be interpreted by the printing apparatus 102 include the XPS in a high-function printer represented by a page printer, the print command filter 212 edits the XPS document as the input and outputs the XPS document. When the XPS document does not need to be processed in the print command filter 212, the XPS document as the input may be output as it is, or a configuration may also be adopted in which the print command filter 212 is not included in the printer driver 201. The above-described processing is the basic processing for the printing from the UWP application 202.

It should be noted that, in a case where the drawing application is a Legacy application 203 such as a Win32 application, to set the print setting, Printer Extensions 209 (hereinafter, PEX) are activated instead of the WSDA. The PEX 209 is activated via the configuration module 208 and can provide the user interface where the user can specify the print setting. The PEX 209 may be provided together with the printer driver 201 as a component in a driver package or may also be separately distributed. Similarly as in the WSDA 207, the PEX 209 can refer to and change the Print Ticket but does not obtain the XPS document. In addition, the PEX 209 does not refer to and change the drawing data in the XPS document. The PEX 209 is activated only in a case where the user issues an instruction on the Legacy application 203 and is not necessarily activated at the time of the printing. When the printing is instructed on the Legacy application 203, the Legacy application 203 generates the XPS document as the printing data. Then, the XPS document output from the Legacy application 203 is obtained and output by the editing application 205. Since the subsequent flow is equivalent to the case of the printing processing from the UWP application 202, the descriptions thereof will be omitted.

Configuration of XPS Document

Herein, the XPS document will be briefly described with reference to FIG. 12. The XPS document has a tree structure in which FixedDocumentSequence (hereinafter, FDS) is set as a root. The FDS includes a plurality of FixedDocuments (hereinafter, FD), and the FD includes a plurality of FixedPages (hereinafter, FP). The FP describes contents of the page of the document in the XML format and includes contents to be actually displayed or printed. Each of the FDS, the FD, and the FP may be referred to as an XPS part in some cases. A resource such as a font or an image used in the page contents of the FP can be shared by a plurality of FPs. Each of the FDS, the FD, and the FP can also hold the print setting by the Print Ticket. Herein, the print setting used when each of the FPs is to be printed corresponds to the Print Ticket in which the Print Ticket of the FDS, the Print Ticket of the parent FD of the printing target FP, and the Print Ticket of the printing target FP are merged into one another. It should be noted that the Print Ticket of the FDS is also referred to as the Print Ticket of the job.

Figure 12:
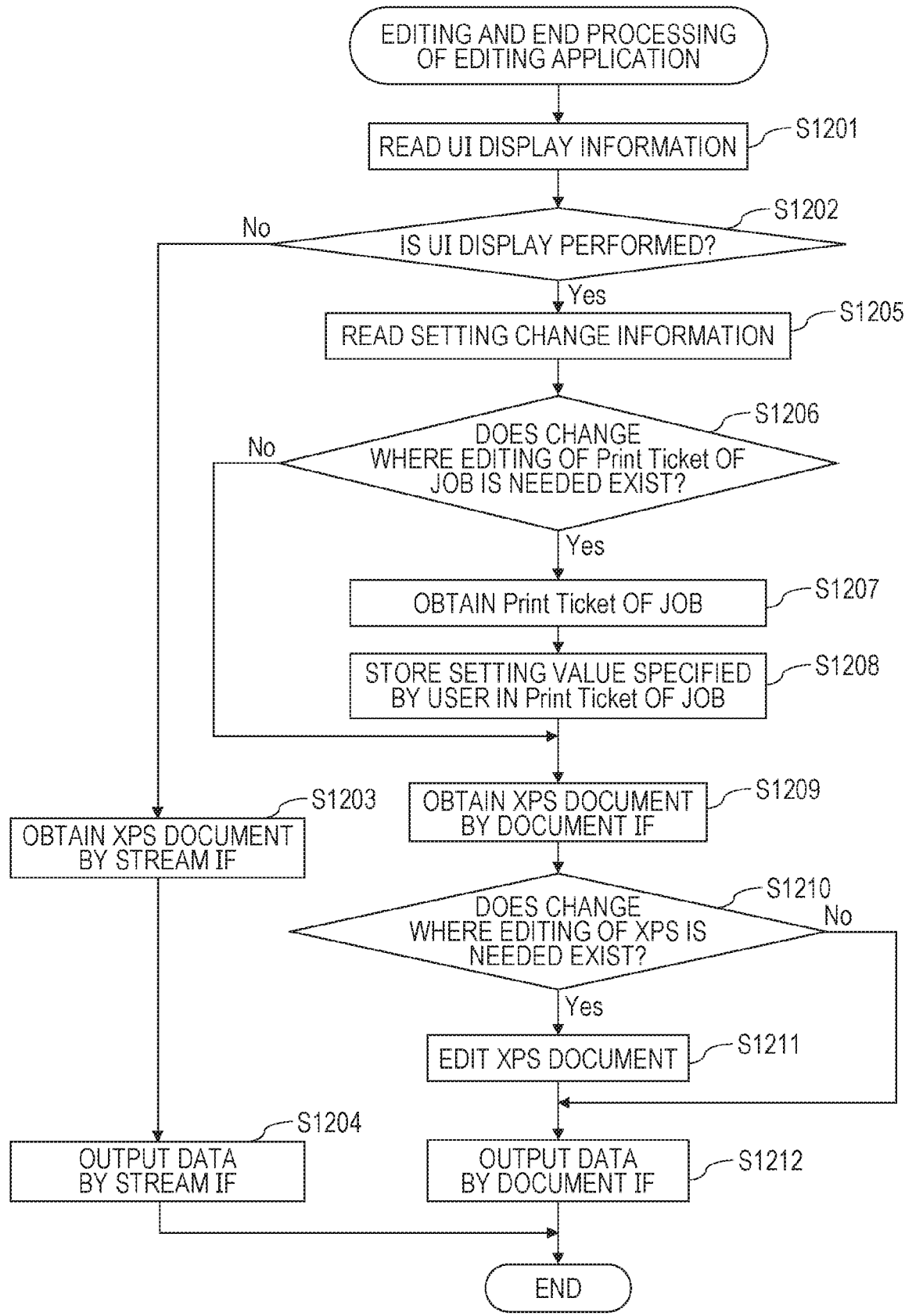
FIG. 12 is a flow chart of editing and end processing of the editing application according to a third exemplary embodiment.
Figure 13:
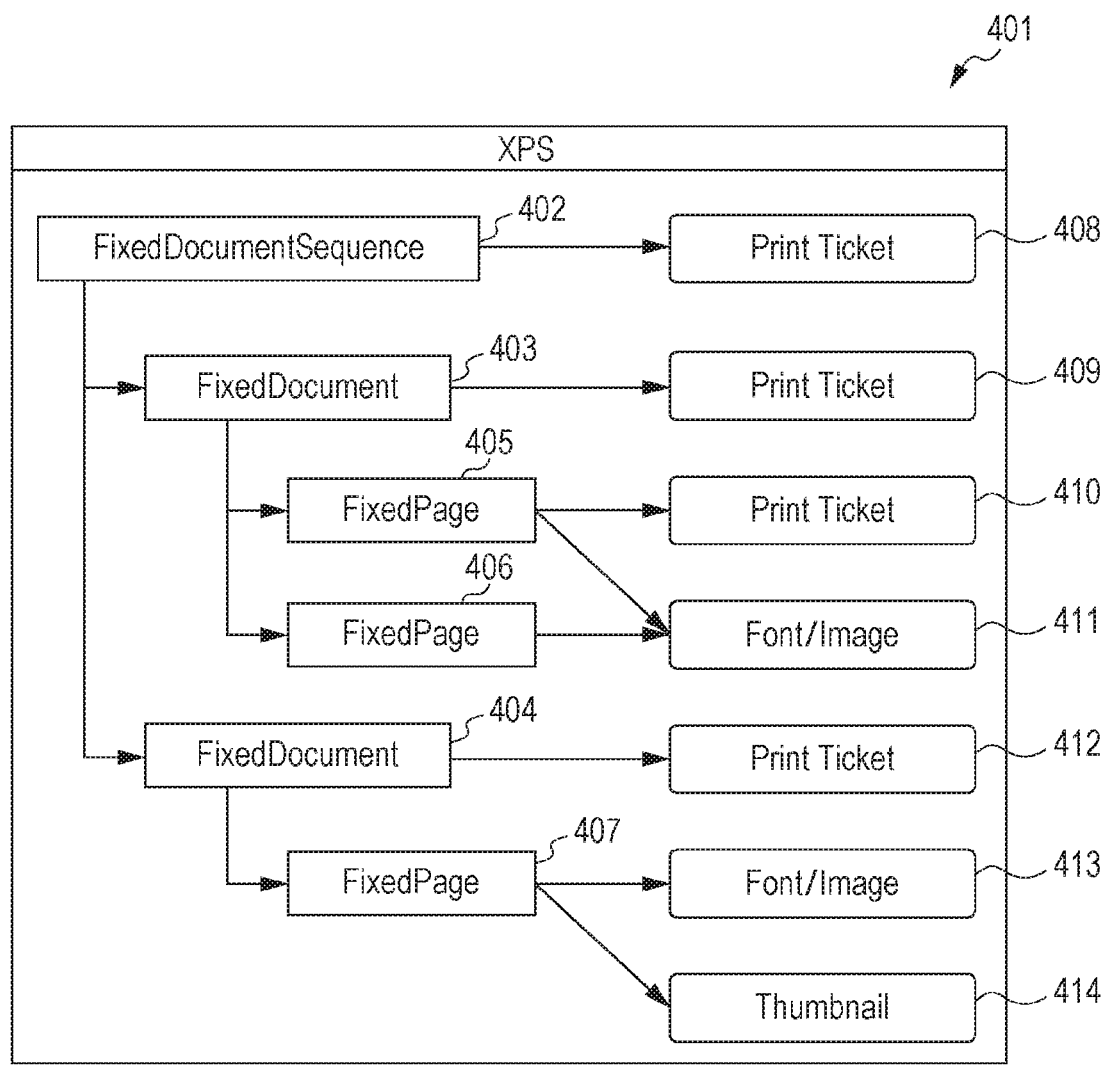
FIG. 13 is a conceptual diagram of a logic structure of XPS.

FIG. 12 is an example of a block diagram illustrating a logical structure of the XPS document. The logical structure of the XPS document 401 is a tree structure in which the FDS 402 is set as a root. The FDS 402 includes the FD 403 and the FD 404 as children. The FD 403 includes the FP 405 and the FP 406 as children. The FD 404 includes the FP 407 as a child. With regard to the Print Ticket in which the print setting is described, the FDS 402 holds a Print Ticket 408. The FD 403 holds a Print Ticket 409. The FP 405 holds a Print Ticket 410. The FD 404 holds a Print Ticket 412. Herein, the Print Ticket 408 of the FDS 402 corresponds to the Print Ticket of the job. Both the Print Ticket 409 of the FD 403 and the Print Ticket 412 of the FD 404 correspond to the Print Ticket of the document. The Print Ticket 410 of the FP 405 in the lower layer corresponds to the Print Ticket of the page.

In FIG. 12, the FP 406 and the FP 407 do not hold the Print Ticket. Herein, for example, the Print Ticket used when the FP 405 is printed corresponds to the Print Ticket in which the Print Ticket 408, the Print Ticket 409, and the Print Ticket 410 are merged into one another. Both the FP 406 and the FP 407 that do not hold the Print Ticket use the Print Ticket in a higher-level layer. For example, the Print Ticket used when the FP 406 is printed corresponds to the Print Ticket in which the Print Ticket 408 and the Print Ticket 409 are merged into each other.

It should be noted that, in FIG. 12, the FP 405 and the FP 406 share a resource 411 such as a font or an image, and the FP 507 uses a resource 413 such as a font or an image. Furthermore, the FP 407 holds a thumbnail image 414.

Setup Processing for Editing Application

Figure 4:
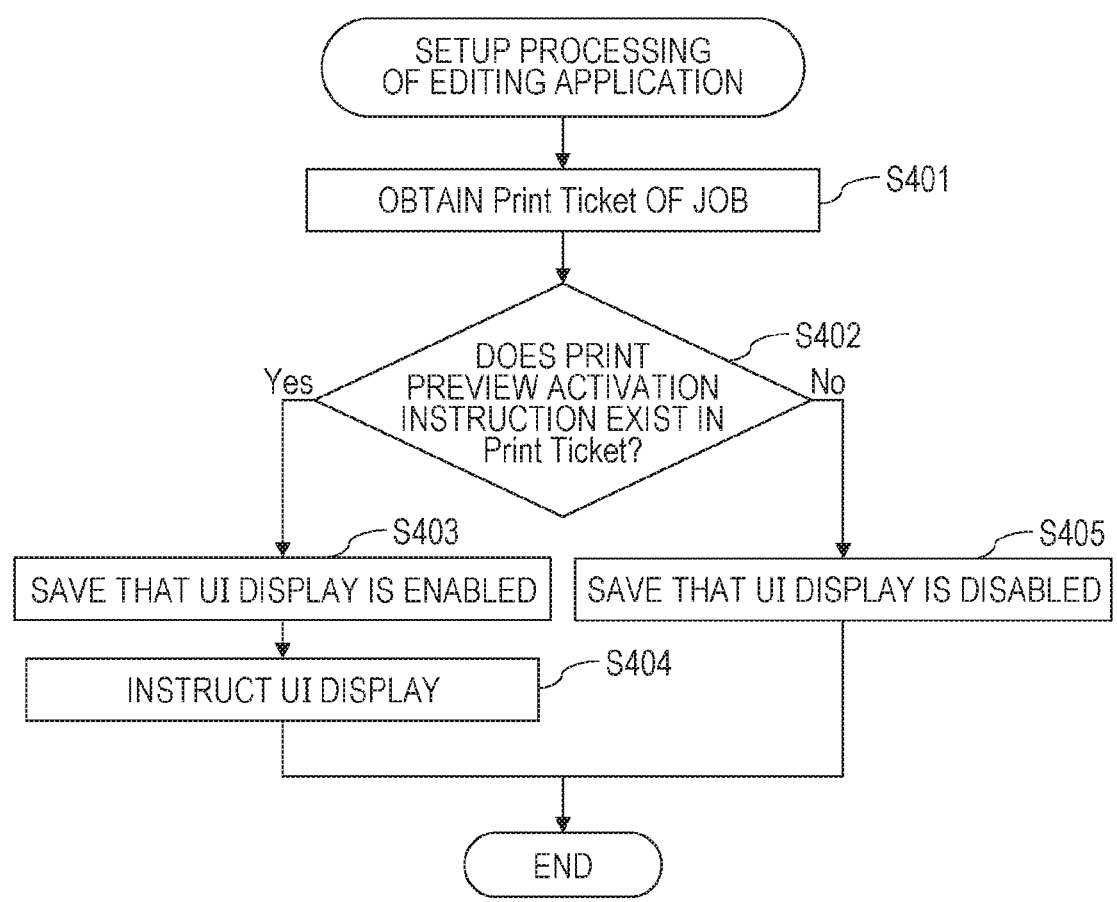
FIG. 4 is a flow chart of setup processing of an editing application.

FIG. 4 illustrates a main processing flow in the setup processing of the editing application 205 in the present printing system. Hereinafter, the editing application 205 may be described as the subject for the respective processes in some cases, but in actuality, the corresponding function is realized when the CPU 111 executes the corresponding program (program of the editing application 205. It should be noted that all the processes are not necessarily sequentially executed on the single process, and a case may also occur where the process temporarily shifts to the OS side, and then the process is called again from the OS. This is merely a flow illustrating the main processing of the editing application 205 in an understandable way for convenience.

When the XPS document is received from the drawing application at the print request source, the editing app launcher 204 calls the initialization processing of the editing application 205 associated with the printing apparatus 102. It should be noted that the print request is issued when the "print" button is instructed on the setting screen 302 provided by the OS after the above-described print setting described with reference to FIGS. 3A to 3C is performed, and the XPS document is output from the drawing application. The editing application 205 registers the setup processing illustrated in FIG. 6 and editing and end processing illustrated in FIG. 8 which will be described below as the event handler specified by the OS in the initialization processing. When the editing application 205 ends the initialization processing, the OS executes the setup processing of the editing application 205 registered as the specified event handler. FIG. 4 illustrates the setup processing.

First, the editing application 205 obtains the Print Ticket of the job which is stored in the XPS document (S401). As described with reference to FIG. 2, the Print Ticket is data including the information indicating the print setting and is generated by the configuration module 208 on the basis of the print setting instructed by the user. The Print Ticket can be obtained from the XPS document by calling a predetermined API of the OS.

Next, a reference is made to the obtained Print Ticket of the job, and it is checked whether or not a print preview activation instruction exists (S402). A specific checking method for the Print Ticket will be described with reference to FIG. 6. The print preview activation instruction may also be realized by a method other than the Print Ticket as long as a specification can be performed from the WSDA 207 or the PEX 209 and also a reference can be made from the editing application 205. For example, a configuration may be adopted in which UserPropertyBag or QueuePropertyBag provided by the OS is used as a storage location of the setting information of the printer driver 201. It should be noted that the print preview refers to displaying of the image of the print result which is to be generated on the sheet surface on the basis of the print setting and the drawing data generated by the drawing application on the display unit 119. That is, a state in which "the print preview activation instruction exists in the Print Ticket" indicates that displaying on a print preview screen is instructed by the user. When the user observes the print preview screen, before the printing, the user checks whether or not a desired print result is to be obtained, and correction of the print setting, deletion of a particular page, or cancellation of the printing processing can be instructed when necessary.

In S402, in a case where it is determined that the print preview activation instruction exists, the editing application 205 saves storage information indicating that the print preview is "enabled" (S403). A Local Storage provided by the OS is used for the holding of the information of the editing application 205 described in the processing in S403 and subsequent steps, for example. The storage information stored in the Local Storage is information associated with the print setting, and a detail thereof will be described below with reference to FIG. 10.

Thereafter, the specified API provided by the OS is called, and the provision of the user interface is instructed in the subsequent processing of the editing application 205 (S404). When this API is executed, the UI processing of the editing application 205 illustrated in FIG. 7 which will be described below is called, and the editing application 205 displays the user interface.

In S402, in a case where it is determined that the print preview activation instruction does not exist, the editing application 205 saves a state indicating the print preview is "disabled" in the storage information in the Local Storage (S405).

As described above, in the setup processing of the editing application 205, the editing application 205 determines whether or not the activation of the user interface is needed. In a case where the activation of the user interface is needed, the activation is instructed, and also information used for the subsequent processing is stored.

Configuration Examples of Print Ticket and Print Capabilities

FIG. 5 illustrates an example of the Print Capabilities of the printer driver. It should be noted that, with regard to these Print Capabilities, parts necessary for the descriptions are mainly described, and some parts are omitted.

In the Print Capabilities, a function that the driver includes (Feature) and setting items that can be set in the respective functions (Option) are represented. In the example of FIG. 5, Print Capabilities 500 represent that plain paper (Plain) and photo paper (PhotoPaper) can be set as a media type (PageMediaType).

FIG. 6 illustrates an example of the Print Ticket generated on the basis of the Print Capabilities 500 of the printer driver illustrated in FIG. 5. As illustrated in FIG. 6, setting values of the respective functions defined by the Print Capabilities are stored in the Print Ticket. For example, the Feature corresponding to psk:PageMediaType indicates a media type used for the printing. The Print Ticket in FIG. 6 indicates psk:Plain. That is, plain paper is specified. The determination processing on the presence or absence of the print preview activation instruction in S402 determines whether or not a specified value of the Feature corresponding to ns0000:JobPreview is ns0000:ON.

UI Processing of Editing Application

Figure 7:
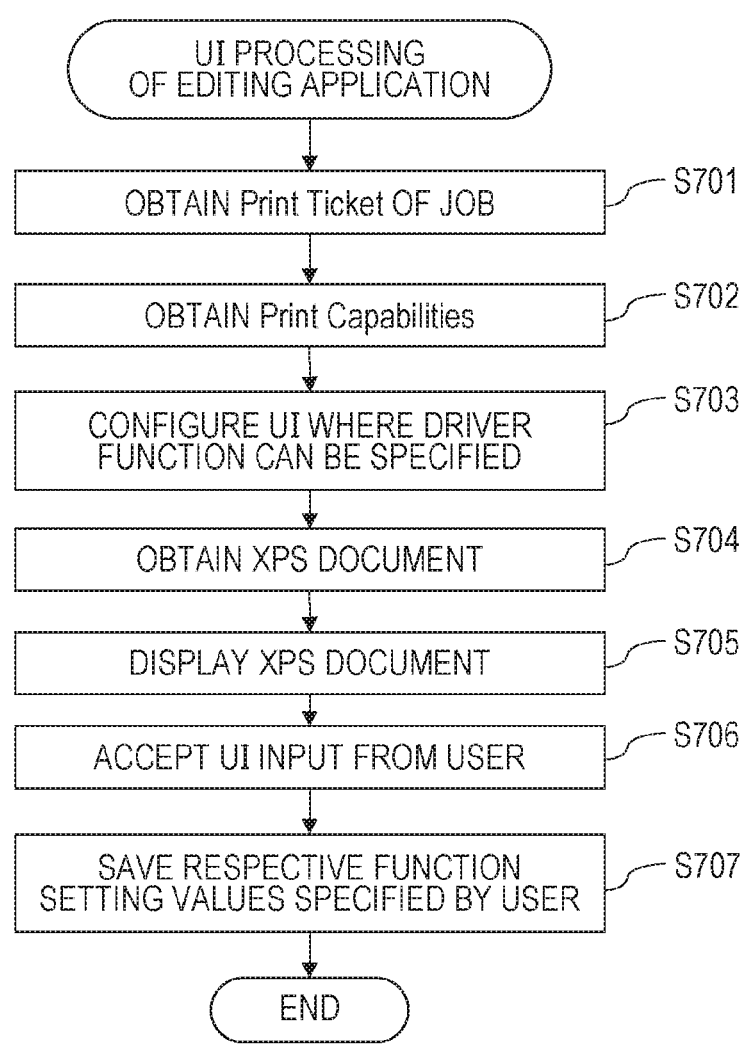
FIG. 7 is a flow chart of UI processing of the editing application.

In a case where the display specification of the UI in S404 is executed, the OS calls the UI processing of the editing application 205 after the setup processing of the editing application 205 is ended. FIG. 7 illustrates a main processing flow in the UI processing of the editing application 205 in the present printing system. Hereinafter, the editing application 205 may be described as the subject for the respective processes in some cases, but in actuality, the corresponding function is realized when the CPU 111 executes the corresponding program. It should be noted that all the processes are not necessarily sequentially executed on the single process, and a case may also occur where the process temporarily shifts to the OS side, and then the process is called again from the OS. This is merely a flow illustrating the main processing of the editing application 205 in an understandable way for convenience. It should be noted that, in a case where the display specification of the UI in S404 is not executed, the OS skips the UI processing illustrated in FIG. 7 and calls the editing and end processing which will be described below.

First, the editing application 205 obtains the Print Ticket of the job by using the predetermined API of the OS (S701). The editing application 205 is provided with a device that obtains the Print Ticket of the job as the function of the OS. When this is used, the editing application 205 can easily refer to and change the print setting of the job without directly dealing with the Print Ticket in the XPS document. In addition, the Print Ticket of the job can be obtained before the XPS document is completely generated, which contributes to improvement in performance since the processing is performed in advance. Furthermore, the editing application 205 obtains the Print Capabilities by using the predetermined API of the OS on the basis of the obtained Print Ticket (S702).

Next, the editing application 205 configures (generates) a user interface including a control item with which it is possible to specify the function to be provided in the print preview on the basis of the obtained Print Ticket and PrintCapability (S703).

The editing application 205 then obtains the XPS document by using the predetermined API of the OS (S704). Furthermore, the editing application 205 analyzes the contents of the XPS document and displays the screen based on the XPS document on the display unit 119 (S705).

Figure 8:
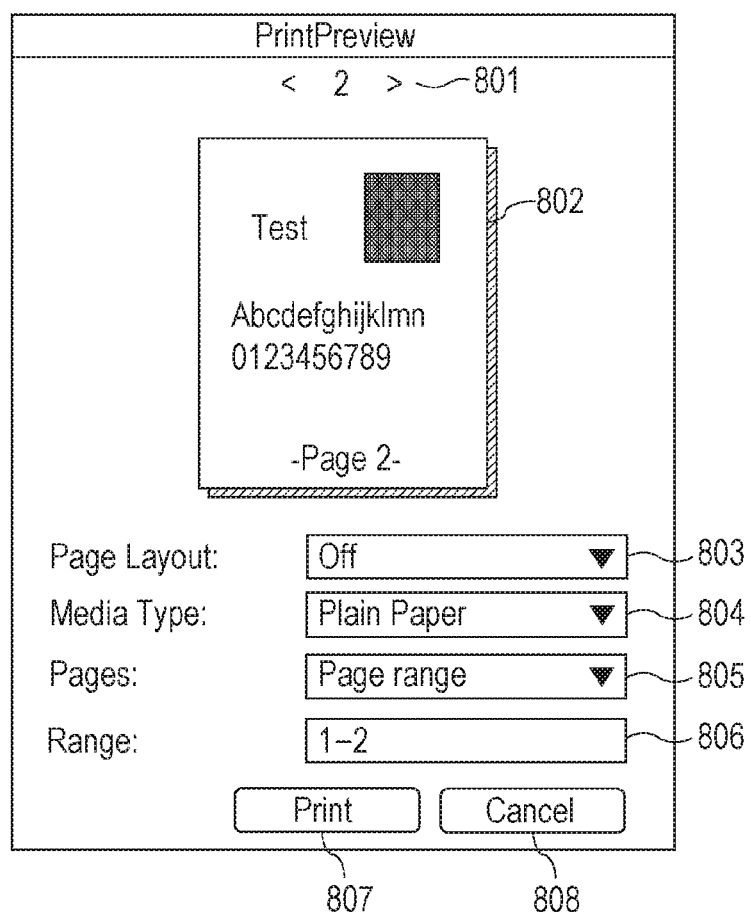
FIG. 8 is a schematic diagram of a user interface of the editing application.

As an example of the user interface generated by the editing application 205, FIG. 8 illustrates an example of the print preview screen provided by the editing application 205. A display item 801 is a control item for changing a page to be displayed on the print preview. The user can change the displayed page by using this control item and also check the current printing data and a total number of pages for the printing generated in the print setting. A display item 802 is a print preview screen displaying an image of the print result on a specified page. A display item 803 is a control item for specifying a layout printing function. A display item 804 is a control item for specifying a media type. Since the functions that the driver includes (functions supported by the driver) are displayed by the display items 803 and 804, as described above, the selection items are pursuant to the Print Capabilities. Display items 805 and 806 are control items for specifying a print range. The user can specify a type of the print range by the display item 805. Types of the print range include "print all pages", "print specified range", and the like. The user can also specify the print range when "print specified range" is selected in the display item 805 by the display item 806. In the example of FIG. 8, the first page and the second page are specified as the printing target. It should be noted that the printer driver 201 in the present example is not provided with a function for changing the print range. That is, the change function for the print range is not described in the PrintCapability of the printer driver 201 in the present example. A display item 807 is a button for starting the printing. A display item 808 is a cancel button. When the user presses this cancel button, the subsequent printing processing is cancelled.

According to the present exemplary embodiment, the editing application 205 can realize the more accurate print preview by reflecting the setting values set in the Print Ticket.

The XPS document obtained by the editing application 205 is generated by the drawing application at the print request source and is data before the printer driver 201 processes. In other words, the editing application 205 obtains the XPS document before the printer driver 201 does. Therefore, for example, even when the setting of the layout printing is specified in the Print Ticket in the XPS document, the layout processing is not applied to the drawing data in the XPS document which is received by the editing application 205. While the above-described case is considered, the editing application 205 can display the print preview screen on which the print settings are reflected on the display unit 119. In a case where the print setting is changed on the user interface displayed by the editing application 205, the editing application 205 displays the print preview screen on which the above-described change is reflected on the display unit 119 again.

It should be noted that two methods exist as the data creating method for the preview display of the editing application 205. The first method is a method for the editing application 205 to edit the drawing data of the XPS document itself. In the case of this method, the editing application 205 performs the editing for reflecting the setting of the layout printing with respect to the drawing data. The second method is a method of changing a method for the display of the drawing data while the editing application 205 does not edit the drawing data of the XPS document. In the case of this method, when a 2-in-1 layout setting is adopted, for example, it looks on appearance as if the setting of the layout printing is reflected when the editing application 205 merely arranges two pages in the drawing data together. In S705, it is assumed that the preview display is performed by using the second method. However, the preview display according to the present exemplary embodiment can also be executed by using the first method.

When the editing application 205 accepts an input from the user (S706) and the printing is instructed on the user interface illustrated in FIG. 8, the setting values of the respective functions which are specified by the user are saved in the Local Storage as the storage information of FIG. 10 (S707). With the above-described processes, the UI processing of the editing application 205 is ended.

According to the present configuration, it is possible to realize the print preview function for displaying the print image close to the print result on the basis of the drawing data generated by the drawing application and the print setting specified by the user before the printing is performed. In addition, it is possible to perform a change for a final adjustment of the print setting while the print result and the number of print pages are checked on the print preview screen provided by the editing application 205. With these functions, it is possible to provide a final adjustment device that fits the printing within a desired number of pages, for example, while misprinting is avoided.

Interface Used by Editing Application 205

In this manner, when the editing application 205 is used, it is possible to provide the function that is not provided by the WSDA 207 alone. However, the following deliberation is needed since the editing application 205 is activated in response to the print request from the user. That is, when the editing application 205 is activated in response to the print request, the editing application 205 regularly obtains and outputs the XPS document. In other words, the editing application 205 is activated when a situation is matched with an activation condition even in a case where the function is not to be provided to the user. For example, in a case where the print preview function is provided by the editing application 205, the editing application 205 is activated even when the user does not use the print preview function, and the editing application 205 obtains and outputs the XPS document. As a result, even when the user does not use the preview function, there is a possibility that performance may be decreased simply because the editing application exists.

In the editing application 205, as an input and output interface where the obtainment and the output of the XPS document are performed, two types of access methods including an interface in a stream format and an interface in a document format exist. The XPS document is treated as a byte stream as it is in the interface in the stream format. That is, the data obtained in the stream format is obtained by collecting the XPS parts together to be subjected to ZIP compression. Therefore, the decrease in performance is suppressed in the case of the interface in the stream format. It should be noted that the XPS parts mentioned herein refer to the FDS, the FD, the FP, the Print Ticket attached to those, and the resource such as the image or the font. However, in a case where the data obtained by using the interface in the stream format is to be edited, the data in the byte stream needs to be analyzed, and complex processing is needed. On the other hand, the XPS document is treated as a package having an API where accesses can be made to the respective XPS parts in the interface in the document format. In a case where the interface in the document format is used, the editing application 205 obtains the XPS document in a format called object model. The XPS document is treated in units of XPS part and is input and output for each of the XPS parts in the interface in the document format. For this reason, in a case where the interface in the document format is used, it is not necessary to analyze the XPS document to extract the XPS parts. Therefore, the editing of the XPS document is easier for the data obtained by using the interface in the document format than the stream format. However, since the data analysis is needed for the package generation, the processing is not started until pieces of necessary data in the XPS document are obtained, and the decrease in performance may occur.

In view of the above, according to the present exemplary embodiment, an appropriate interface is used as the input and output interface of the XPS document in the editing application 205. Hereinafter, a detail thereof will be described. It should be noted that any one of the stream format and the document format may be used since the input and output interface of the XPS document in the UI processing of the editing application 205 in FIG. 7 does not involve the editing of the XPS document. It should be noted that the interface in the document format may be used in a case where the editing of the XPS document is performed at the time of the display processing in S705.

Figure 9:
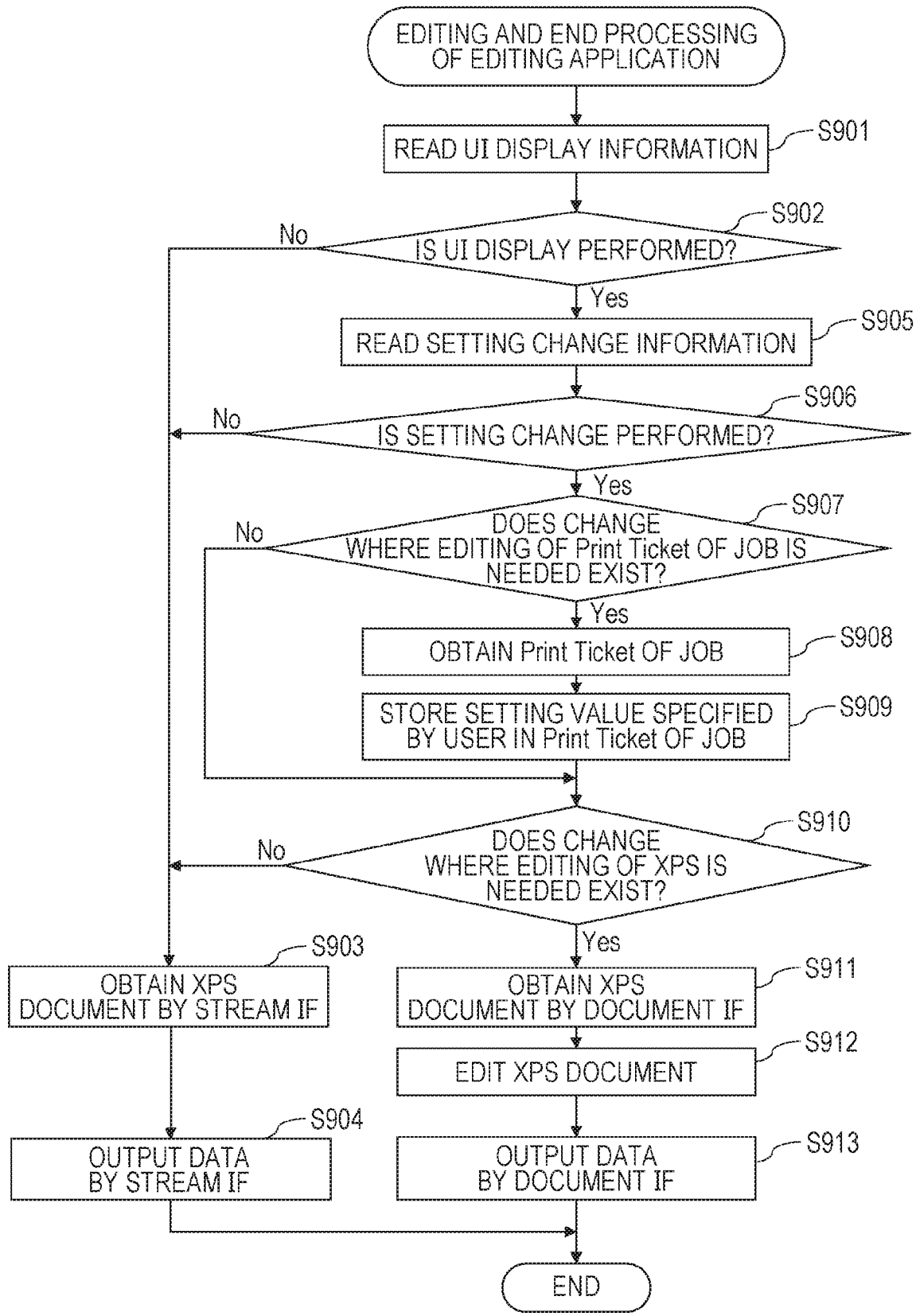
FIG. 9 is a flow chart of editing and end processing of the editing application.

The processing of the editing application 205 in FIG. 4 and FIG. 9 is processing in a background, and the processing of the editing application 205 in FIG. 7 is processing in a foreground.

Editing and End Processing of Editing Application

The editing processing of the editing application 205 will be described with reference to FIG. 9. After the UI processing of the editing application 205 in FIG. 7 is ended, the OS calls the editing and end processing of the editing application 205 of FIG. 9. It should be noted that, in a case where the display specification of the UI processing in S404 is not executed, the OS calls the present processing without calling the UI processing of the editing application 205 in FIG. 7. Hereinafter, the editing application 205 may be described as the subject for the respective processes in some cases, but in actuality, the corresponding function is realized when the CPU 111 executes the corresponding program. In addition, all the processes are not necessarily sequentially executed on the single process, and a case may also occur where the process temporarily shifts to the OS side, and then the process is called again from the OS. This is merely a flow illustrating the main processing of the editing application 205 in an understandable way for convenience.

The editing application 205 reads the UI display information in the storage information saved in S403 (S901). In S902, the editing application 205 determines whether or not the UI display is performed. In S902, in a case where it is determined that the UI display is not performed, the use of the interface in the stream format is decided, and the editing application 205 obtains the XPS document by using the interface in the stream format (S903). This is because the use of the interface in the stream format is beneficial in terms of performance since the UI display does not exist and accordingly the editing of the XPS document is not needed.

Furthermore, the editing application 205 outputs the XPS document obtained in S903 as it is without editing by using the interface in the stream format similarly as in the case of the obtainment (S904). When the editing application 205 outputs the XPS document, the OS stores the XPS document as the spool file 206. Then, the processing by the printer driver 201 is started.

In S902, in a case where it is determined that the UI display is performed, the editing application 205 reads information associated with the print setting saved in S707 as the storage information (S905). In S906, the editing application 205 determines whether or not the user performs the setting change before and after the UI display. In S906, in a case where it is determined that the setting change is not performed before and after the UI display, the editing application 205 obtains the XPS document by using the interface in the stream format (S903). Then, the XPS document is output as it is by using the interface in the stream format (S904). This is because the use of the interface in the stream format is beneficial in terms of performance since the change instruction of the setting is not performed and accordingly the editing of the XPS document is not needed.

In S906, in a case where it is determined that the setting change is performed, the editing application 205 determines whether or not the setting in which the editing of the Print Ticket of the job by the editing application 205 is needed exists in the changed setting (S907). In a case where the setting in which the editing of the Print Ticket is needed exists in the changed setting, the editing application 205 obtains the Print Ticket of the job by using the predetermined API of the OS (S908). The editing application 205 then performs the editing of the Print Ticket of the job to reflect the setting value related to the driver function in the storage information obtained in S905 on the Print Ticket of the job (S909). It should be noted that the driver function refers to a function that the printer driver 201 includes (which is supported by the printer driver 201). A configuration of the information stored in the Local Storage and a method for the reflection onto the Print Ticket of the job to realize these processes will be described below with reference to FIG. 10. It should be noted that, in a case where a plurality of driver functions that have been changed by the UI input in S706 exist, the editing application 205 performs the processing for reflecting the setting values of all the driver functions on the Print Ticket of the job.

Next, in S910, the editing application 205 determines whether or not the setting in which the editing of the XPS document by the editing application 205 is needed exists in the changed setting. In this determination, it is determined whether or not the editing by the editing application 205 is needed with regard to at least one of the drawing data in the XPS document and the Print Ticket in the XPS document (except for the Print Ticket of the job). It should be noted that a reason why the Print Ticket of the job is excluded from the determination target in S910 is that the editing of the Print Ticket of the job has been performed already in S907 to S909.

In a case where it is determined that the setting in which the editing of the XPS by the editing application 205 is needed does not exist in the setting changed in S910, the use of the interface in the stream format is decided. The editing application 205 than obtains and outputs the XPS document by using the interface in the stream format (S903, S904). In a case where it is determined that the setting in which the editing of the XPS by the editing application 205 is needed exists in the setting changed in S910, the use of the interface in the document format is decided. The editing application 205 then obtains the XPS document by using the interface in the document format (S911).

In S912, the editing application 205 performs the editing of the XPS document obtained in S911 on the basis of the function specified by the user and the setting value thereof. The editing application 205 then outputs the edited XPS document by using the interface in the document format (S913). When the editing application 205 outputs the edited XPS document, the OS stores the edited XPS document as the spool file 206. When the XPS document is stored in the spool file 206, the processing by the printer driver 201 is started.

It should be noted that the editing application 205 determines whether or not the editing of the Print Ticket of the job is needed and obtains and edits the Print Ticket of the job in S907 to S909 before the obtainment of the XPS document in S911 in FIG. 9. That is, the editing application 205 refers to and changes the print setting of the job without directly dealing with the Print Ticket in the XPS document. This is because, as also described in the processing in S701, the Print Ticket of the job can be obtained before the XPS document is completely generated. The obtainment of the Print Ticket of the job and the editing processing are performed in advance, which contributes the improvement in performance. However, the present exemplary embodiment is not limited to this. S907 to 909 may be omitted. That is, it may be determined in S910 whether or not the editing of the XPS document is needed while including the determination on whether or not the editing of the Print Ticket of the job is needed. In S912, the editing of the XPS document may be executed while including the editing of the Print Ticket of the job.

Here, the storage information stored in the Local Storage will be described with reference to FIG. 10. FIG. 10 illustrates an example of the information stored in the Local Storage. The storage information is constituted by a name and a value and includes information associated with the print setting.

In the processing in S403 of FIG. 4, to indicate that the UI display is enabled, a setting value of ON information under the name of RequestUI is added to the Local Storage. In addition, in the processing in S405, to indicate that the UI display is disabled, a setting value of OFF information under the name of RequestUI is added to the Local Storage.

In the processing in S707 of FIG. 7, the setting values of the respective functions specified by the user on the print preview screen are saved in the Local Storage. In the example of FIG. 10, it is assumed that the user changes three settings including Page Layout, Pages, and Range on the preview screen of FIG. 8.

An item having a name of JobNUpAllDocumentsContiguously that is a setting item of the Print Ticket is stored in the Local Storage with respect to the Layout change. Then, PagePerSheet_2 that is an Option name corresponding to a setting item of the Page Layout specified by the user is added to the above-described item as the setting value. That is, by the Layout change on the UI of FIG. 8, the information indicating the change to the print setting is newly added into the storage information that is information associated with the print setting of FIG. 10.

With respect to the setting of the Pages, information in which Ranges indicating a range specification are set as the setting values are added under the name of Pages to the Local Storage. Since the range specification is specified in the Pages, information indicating the specific range such as the information of the setting value indicating the print range of "1-2" is added under the name of Range to the Local Storage. That is, due to the changes to the setting of the Pages and the setting of the Ranges on the UI of FIG. 8, the information indicating the changes to the print setting is newly added into the storage information that is the information associated with the print setting of FIG. 10.

In this manner, the reference is made to the storage information of FIG. 10 which is stored in FIG. 4 and FIG. 7, and the processing in FIG. 9 is performed. Specifically, in the processing in S902, the editing application 205 checks the setting value in the RequestUI of FIG. 10. In a case where the setting value is ON, it is determined that the UI display is performed.

In the processing in S906, the editing application 205 also checks the setting items on the second and subsequent columns in FIG. 10 which are stored in the Local Storage. In the case of FIG. 10, since pieces of the information of JobNUpAllDocumentsContiguously, Pages, and Range are added, it is determined that the changes to the setting have been performed.

In the processing in S907, the editing application 205 determines whether or not the change to the Print Ticket of the job is needed from the information stored in the Local Storage. Specifically, when it is determined that the setting with regard to the function supported by the driver like the layout printing has been changed, it is determined that the change to the Print Ticket of the job is needed. In the example of FIG. 10, since the information of JobNUpAllDocumentsContiguously is added, it is determined that the setting of the layout printing has been changed, and it is determined that the change to the Print Ticket of the job is needed.

In S909, the editing application 205 edits the Print Ticket of the job. Specifically, the setting value in the storage information is set as the Option with respect to the Feature in the Print Ticket corresponding to the name of the storage information of FIG. 10. That is, the Option of the Feature corresponding to JobNUpAllDocumentsContiguously in the Print Ticket of the job of FIG. 6 is changed to PagePerSheet_2. As a result, the setting change instructed by the user is reflected on the Print Ticket of the job. Then, the printer driver 201 can generate the print command to be transmitted to the printer in accordance with the setting of the Print Ticket. That is, in the case of the present example, in order for the printer driver 201 to execute the layout printing for printing two pages on one sheet on the basis of the Print Ticket of the job, the printer driver 201 generates the print command by editing the drawing data in the XPS document.

In the processing in S910, the editing application 205 determines whether or not the change in which the editing of the XPS document by the editing application 205 is needed exists on the basis of the storage information in the Local Storage. For example, in a case where the printer driver 201 is not compatible to the function for the setting change to the print range, the printer driver 201 does not change the XPS document for changing the print range. Therefore, the editing of the XPS document by the editing application 205 is needed, and in the above-described case, it is determined that the change in which the editing of the XPS document is needed exists. In the example of FIG. 10, since the item of the Range is added, it is determined that the change setting of the print range corresponding to the function that is not supported by the printer driver 201 has been done, and it is determined that the editing of the XPS document by the editing application 205 is needed.

In S912, the editing application 205 performs the editing of the XPS document. Specifically, since the print range is set as "from the first page to the second page" in the item of the Range of the storage information of FIG. 10, page data of the third and subsequent pages in the drawing data of the obtained XPS document is deleted from the XPS document. As a result, the printer driver 201 generates the print command while the XPS document edited by the editing application 205 is set as the input. Therefore, the printer driver 201 itself can set only the specified range as the printing target without performing the editing of the XPS document for the change to the print range.

As described above, according to the present exemplary embodiment, when the editing application 205 is used, it is possible to provide the GUI in response to the print request. In addition, the editing of the Print Ticket of the job and the XPS document can be performed by the editing application 205 on the basis of the input of the print setting on the GUI provided by the editing application 205.

The printer drivers have different supported functions (functions that can be provided) depending on types. However, it is possible to reduce function disparity based on the types of the printer drivers by the editing application 205 according to the present exemplary embodiment. That is, the editing application 205 can perform the editing of the XPS document with regard to the function that is not supported by the printer driver (extension function). Therefore, even the function that is not supported by the printer driver can be provided to the user. In particular, even the printer driver that has only a basic function such as a standard printer driver can provide a function close to a model specific printer driver by using the editing application 205. It should be noted that, with regard to the function supported by the printer driver, after the editing for reflecting the setting change on the Print Ticket is performed, the printer driver may be in charge of editing the drawing data of the XPS document. The editing application 205 may determine whether or not the function is a function supported by the driver on the basis of the information related to the previously stored function and may also perform the determination by obtaining the PrintCapability.

The editing application 205 according to the present exemplary embodiment uses the interface in the stream format in a case where the editing of the XPS document by the editing application 205 is not needed. On the other hand, in a case where the editing of the XPS document by the editing application 205 is needed, the editing application 205 uses the interface in the document format. That is, in a case where the user does not use the print preview display or a case where the user does not perform the setting change even when the print preview display is used, since the editing of the XPS document by the editing application 205 is not needed, the editing application 205 uses the interface in the stream format. As a result, it is possible to reduce the influence of the decrease in performance which is caused by the activation of the editing application 205. On the other hand, in a case where the editing of the XPS document by the editing application 205 is needed, the editing of the XPS document by the editing application 205 can be performed by the use of the interface in the document format.

Second Exemplary Embodiment

Next, a second exemplary embodiment will be described. According to the first exemplary embodiment, the editing application 205 presents the function in which the setting can be changed to the user by displaying the UI and determines whether or not the editing of the XPS document by the editing application 205 is needed in accordance with the user instruction. Then, the interface is switched depending on whether or not the editing of the XPS document by the editing application 205 is needed. On the other hand, according to the second exemplary embodiment, a feature resides in that the editing application 205 switches the interface depending on whether or not the UI display by the editing application 205 is performed.

Since a hard configuration of the printing system is the same as that of the first exemplary embodiment, descriptions thereof will be omitted. With regard to the flows of the respective processes too, a flow is also the same as that of the second exemplary embodiment except for the flow of the editing and end processing of the editing application 205 according to the first exemplary embodiment (FIG. 9). Therefore, different parts from the first exemplary embodiment will be mainly described below.

FIG. 12 illustrates an example of the editing and end processing according to the second exemplary embodiment. After the UI processing of the editing application 205 in FIG. 7 is ended, the OS calls the editing and end processing of the editing application 205 in FIG. 12. It should be noted that, in a case where the display specification of the UI processing is not executed in S404, the OS calls the present processing without calling the UI processing of the editing application 205 in FIG. 7. Hereinafter, the editing application 205 may be described as the subject for the respective processes in some cases, but in actuality, the corresponding function is realized when the CPU 111 executes the corresponding program. In addition, all the processes are not necessarily sequentially executed on the single process, and a case may also occur where the process temporarily shifts to the OS side, and then the process is called again from the OS. This is merely a flow illustrating the main processing of the editing application 205 in an understandable way for convenience.

The editing application 205 reads the UI display information in the storage information of FIG. 10 which is saved in S403 (S1201). Then, in S1202, the editing application 205 determines whether or not the UI display is performed. In S1202, in a case where it is determined that the UI display is not performed, the editing application 205 obtains the XPS document by using the interface in the stream format (S1203). This is because, when the UI display is not performed, the change to the print setting is not performed, and accordingly the editing of the XPS document is not needed. Therefore, a benefit is attained in terms of performance by the use of the interface in the stream format.

In S1204, the editing application 205 outputs the XPS document obtained in S1203 as it is without editing by using the interface in the stream format. When the editing application 205 outputs the XPS document, the OS stores the XPS document as the spool file 206, and the processing by the printer driver 201 is started.

In S1202, in a case where it is determined that the UI display is performed, the editing application 205 reads the information associated with the print setting of FIG. 10 which is saved as the storage information in S707 (S1205). Next, the editing application 205 determines whether or not the setting change in which the editing of the Print Ticket of the job is needed exists in the storage information of FIG. 10 (S1206). In a case where the setting change in which the editing of the Print Ticket of the job is needed exists, the editing application 205 obtains the Print Ticket of the job by using the predetermined API of the OS (S1207). The setting value related to the function supported by the printer driver 201 (driver function) in the storage information obtained in S1205 is then reflected on the Print Ticket of the job (S1208). It should be noted that, since the processing in S1201 to S1208 is the same as the processing in S901 to S909 in FIG. 9 except for the exclusion of S906, the detail thereof is omitted.

Next, the editing application 205 obtains the XPS document by using the interface in the document format (S1209). In S1210, it is determined whether or not the setting change in which the editing of the XPS document by the editing application 205 is needed exists on the basis of the storage information obtained in S1205. Although steps to proceed after the determination are different in the determination processing in S1210, since the contents of the determination are the same as S910 in FIG. 9, the detail thereof will be omitted.

In S1210, in a case where it is determined that the setting change in which the editing of the XPS by the editing application 205 is needed exists in the storage information, the editing application 205 performs the editing of the obtained XPS document on the basis of the function specified by the user and the setting value thereof (S1211). The editing application 205 than outputs the edited XPS document by using the interface in the document format (S1212). It should be noted that the processing in S1211 and S1212 is the same as the processing in S911 and S912 in FIG. 9, and the detail thereof will be omitted.

In S1210, in a case where it is determined that the setting change in which the editing of the XPS by the editing application 205 is needed does not exist in the storage information, the editing application 205 outputs the obtained XPS document without editing by using the interface in the document format (S1212).

As described above, the editing application 205 according to the present exemplary embodiment uses the interface in the stream format in a case where the UI display is not performed and uses the interface in the document format in a case where the UI display is performed. As a result, in a case where the user does not use the UI function such as the print preview function, the editing application 205 can suppress the decrease in performance which is caused by the activation of the editing application 205.

Third Exemplary Embodiment

Next, a third exemplary embodiment will be described. According to the first exemplary embodiment and the second exemplary embodiment, the editing application 205 provides the function that can be set to the user by displaying the UI. However, the editing application 205 can perform the editing of the XPS document without displaying the UI. Therefore, the editing application 205 according to the present exemplary embodiment does not perform the instruction of the UI display in the setup processing. When the instruction of the UI display is not performed, the UI processing is not called, and the editing application 205 executes the editing and end processing. For example, in a case where a particular watermark (stamp) is forcedly added in accordance with a previously determined setting, the editing application 205 does not need the user instruction. Therefore, the editing application 205 does not perform the UI display but performs the editing of the XPS document to add the watermark. Hereinafter, the processing according to the present exemplary embodiment will be described in detail.

Since the hard configuration of the printing system is the same as that of the first exemplary embodiment, descriptions thereof will be omitted. With regard to the flows of the respective processes too, parts different from the first exemplary embodiment will be mainly described.

Figure 11:
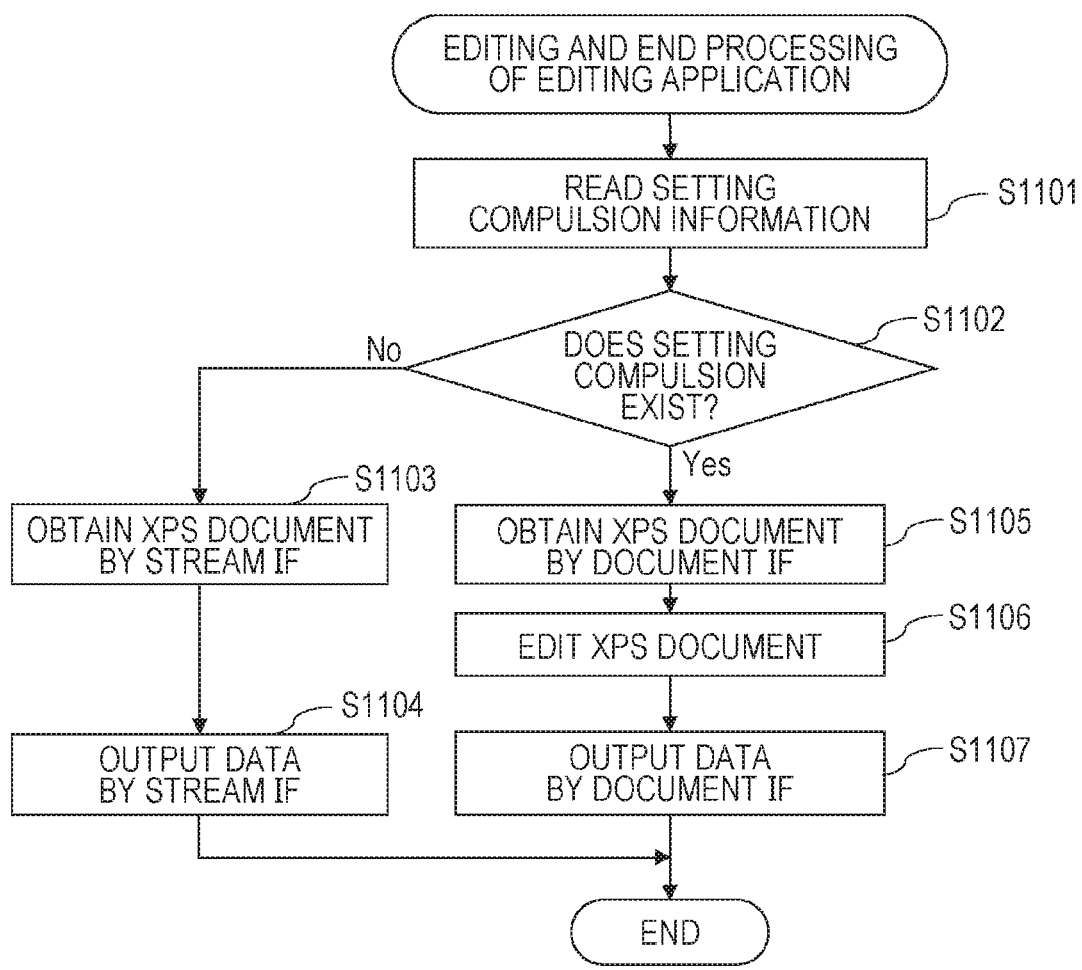
FIG. 11 is a flow chart of editing and end processing of the editing application according to a second exemplary embodiment.

FIG. 11 illustrates an example of the editing and end processing according to the third exemplary embodiment. The OS calls the editing and end processing of the editing application 205 of FIG. 11 after the setup processing of the editing application 205 of FIG. 4 is ended. Hereinafter, the editing application 205 may be described as the subject for the respective processes in some cases, but in actuality, the corresponding function is realized when the CPU 111 executes the corresponding program. In addition, all the processes are not necessarily sequentially executed on the single process, and a case may also occur where the process temporarily shifts to the OS side, and then the process is called again from the OS. This is merely a flow illustrating the main processing of the editing application 205 in an understandable way for convenience.

The editing application 205 obtains previously stored setting compulsion information (S1101). It is conceivable to use UserPropertyBag or QueuePropertyBag provided by the OS as a storage location of the information, but the Print Ticket or the Local Storage may also be used. The setting compulsion information is previously set by a system administrator or the user itself. With regard to the setting compulsion, the particular watermark is added, or a duplex print setting is forcedly turned ON, for example.

In S1102, the editing application 205 determines whether or not the setting compulsion information exists. That is, the editing application 205 determines whether or not a forcedly set function is registered even when the setting from the user on the UI provided by the editing application 205 is not accepted.

In S1102, in a case where it is determined that the setting compulsion information does not exist, since the editing of the XPS document is not needed, the editing application 205 obtains and outputs the data by using the interface in the stream format (S1103, S1104). On the other hand, in S1102, in a case where it is determined that the setting compulsion information exists, since the editing of the XPS document is needed, the editing application 205 obtains the data by using the interface in the document format (S1105).

In S1106, the editing application 205 edits the obtained XPS document. In S1107, the editing application 205 outputs the edited XPS document by using the interface in the document format.

It should be noted that, in a case where the forcedly set function is included in the driver function, it is sufficient when the editing application 205 reflects the setting on the Print Ticket in the XPS document. That is, it is sufficient when the editing application 205 executes only the editing of the Print Ticket in the XPS document without performing the editing of the drawing data in the XPS document. In the present example too, as in S910 in FIG. 9, a configuration may also be adopted in which the determination is previously made on whether or not the setting change in which the change of the XPS document is needed occurs, and the interface in the document format is used only in a case where the change to the XPS document is needed.

According to the present exemplary embodiment, also in a case where the editing of the XPS document is needed while the UI is not displayed, the editing application 205 can suppress the decrease in performance which is caused by the activation of the editing application 205.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method implemented in an information processing apparatus by at least one processor that executes a function extending application that is able to extend a function of a print software generating a print command and is able to perform editing of intermediate data including drawing data generated by a drawing application, the function extending application being an application to be provided by a providing method different from the print software, the control method comprising:
    performing first obtaining processing to obtain information associated with a print setting;
    performing determination processing to determine, on a basis of the obtained information associated with the print setting, which method is selected for obtaining the intermediate data including the drawing data, from a plurality of methods including a first method that obtains the intermediate data part by part and a second method that obtains a plurality of parts of the intermediate data as one file; and
    performing second obtaining processing to obtain the intermediate data by using the selected method,
    wherein the function extending application is launched after a print instruction is input, and performs the first obtaining processing, the determination processing, and the second obtaining processing.

2. The control method according to claim 1, wherein the method used for obtaining the intermediate data is selected based on determining whether or not the information associated with the print setting includes information associated with a setting that the editing of the intermediate data by the function extending application is needed.

3. The control method according to claim 1,
    wherein the first method is determined as the selected method among the plurality of methods in a case where the information associated with the print setting includes information associated with a setting that the editing of the intermediate data by the function extending application is needed, and
    wherein the second method is determined as the selected method among the plurality of methods in a case where the information associated with the print setting does not include the setting that the editing of the intermediate data by the function extending application is needed.

4. The control method according to claim 1,
    wherein the function extending application can provide a graphical user interface (GUI), and
    wherein the second method is determined as the selected method in a case where the GUI is not provided by the function extending application.

5. The control method according to claim 4, wherein the second method is determined as the selected method in a case where a change instruction of the print setting by a user is not performed on the GUI provided by the function extending application.

6. The control method according to claim 4, wherein a screen including a print preview based on the drawing data and a display item for performing a change instruction of the print setting by the user is provided as the GUI.

7. The control method according to claim 1,
    wherein the information associated with the print setting is saved in accordance with the print setting in accordance with a user instruction on a GUI provided by the function extending application, and
    wherein it is determined whether or not the editing of the intermediate data by the function extending application is needed on a basis of the information associated with the print setting saved in accordance with the user instruction on the GUI.

8. The control method according to claim 1,
    wherein the function extending application can provide a graphical user interface (GUI),
    wherein the first method is determined as the selected method among the plurality of methods in a case where the information associated with the print setting includes a setting that provision of the GUI by the function extending application is needed, and
    wherein the second method is determined as the selected method among the plurality of methods in a case where the information associated with the print setting does not include the setting that the provision of the GUI by the function extending application is needed.

9. The control method according to claim 1
    wherein, in a case where the selected method is the first method and the editing of the intermediate data is performed, the edited intermediate data is output part by part, and
    wherein, in a case where the selected method is the second method, the obtained intermediate data is output with a plurality of parts as one file.

10. The control method according to claim 1, wherein the intermediate data is obtained in a document format by the first method, and the intermediate data is obtained in a stream format by the second method.

11. The control method according to claim 10, wherein the intermediate data is obtained as a byte stream by the first method.

12. The control method according to claim 1, wherein the function extending application is an application that is launched in a case where a printer driver that does not include a function for providing a graphical user interface (GUI) is selected and can provide the GUI.

13. The control method according to claim 1, wherein the intermediate data is XML Paper Specification (XPS) data.

14. The control method according to claim 13, wherein the intermediate data includes Fixed Document Sequence (FDS) as a first part, Fixed Document (FD) as a second part, and Fixed Page (FP) as a third part, and the intermediate data is obtained in units of the FDS, the FD, and the FP by the first method.

15. The control method according to claim 1, wherein the second method is a method of obtaining data of all parts of the intermediate data compressed to one file.

16. The control method according to claim 1, wherein the function extending application is provided by a providing method different from the print software by being obtained via the internet in a state where the print software is installed.

17. An information processing apparatus comprising:
at least one processor; and
at least one memory storing a function extending application that is configured to extend a function of a print software generating a print command, and is configured to perform editing of intermediate data including drawing data generated by a drawing application, the function extending application being an application to be provided by a providing method different from the print software, the function extending application causing, when executed by the at least one processor, the information processing apparatus to function as
a first obtaining unit configured to obtain information associated with a print setting,
a determining unit configured to determine, on a basis of the obtained information associated with the print setting, which method is selected for obtaining the intermediate data including the drawing data, from a plurality of methods including a first method that obtains the intermediate data part by part and a second method that obtains a plurality of parts of the intermediate data as one file; and
a second obtaining unit configured to obtain the intermediate data by using the selected method,
wherein the function extending application is launched after a print instruction is input.

18. The information processing apparatus according to claim 17, wherein the method used for obtaining the intermediate data is selected based on determining whether or not the information associated with the print setting includes information associated with a setting for which the editing of the intermediate data by the function extending application is needed.

19. The information processing apparatus according to claim 17,
wherein the first method is determined as the selected method among the plurality of methods in a case where the information associated with the print setting includes information associated with a setting for which the editing of the intermediate data by the function extending application is needed, and
wherein the second method is determined as the selected method among the plurality of methods in a case where the information associated with the print setting does not include the setting for which the editing of the intermediate data by the function extending application is needed.

20. The information processing apparatus according to claim 17,
wherein, in a case where the selected method is the first method and the editing of the intermediate data is performed, the edited intermediate data is output part by part, and
wherein, in a case where the selected method is the second method, the obtained intermediate data is output with a plurality of parts as one file.

21. The information processing apparatus according to claim 17,
wherein the function extending application can provide a graphical user interface (GUI), and
wherein the second method is determined as the selected method in a case where the GUI is not provided by the function extending application.

22. The information processing apparatus according to claim 21, wherein the second method is determined as the selected method in a case where a change instruction of the print setting by a user is not performed on the GUI provided by the function extending application.

23. The information processing apparatus according to claim 21, wherein a screen including a print preview based on the drawing data and a display item for performing a change instruction of the print setting by the user is provided as the GUI.

24. The information processing apparatus according to claim 17,
wherein the information associated with the print setting is saved in accordance with the print setting in accordance with a user instruction on a GUI provided by the function extending application, and
wherein it is determined whether or not the editing of the intermediate data by the function extending application is needed on a basis of the information associated with the print setting saved in accordance with the user instruction on the GUI.

25. The information processing apparatus according to claim 17,
wherein the function extending application can provide a graphical user interface (GUI),
wherein the first method is determined as the selected method among the plurality of methods in a case where the information associated with the print setting includes a setting for which provision of the GUI by the function extending application is needed, and
wherein the second method is determined as the selected method among the plurality of methods in a case where the information associated with the print setting does not include the setting for which the provision of the GUI by the function extending application is needed.

26. The information processing apparatus according to claim 17, wherein the intermediate data is obtained in a document format by the first method, and the intermediate data is obtained in a stream format by the second method.

27. The information processing apparatus according to claim 26, wherein the intermediate data is obtained as a byte stream by the first method.

28. The information processing apparatus according to claim 17, wherein the function extending application is an application that is launched in a case where a printer driver that does not include a function for providing a graphical user interface (GUI) is selected and can provide the GUI.

29. The information processing apparatus according to claim 17, wherein the intermediate data is XML Paper Specification (XPS) data.

30. The information processing apparatus according to claim 29, wherein the intermediate data includes Fixed Document Sequence (FDS) as a first part, Fixed Document (FD) as a second part, and Fixed Page (FP) as a third part, and the intermediate data is obtained in units of the FDS, the FD, and the FP by the first method.

31. The information processing apparatus according to claim 17, wherein the second method is a method of obtaining data of all parts of the intermediate data compressed to one file.

32. The information processing apparatus according to claim 17, wherein the function extending application is provided by a providing method different from the print software by being obtained via the internet in a state where the print software is installed.

\* \* \* \* \*